United States Patent [19]

Schlunke

[11] Patent Number: 4,941,607
[45] Date of Patent: Jul. 17, 1990

[54] MAGAZINE FOR CALENDER ROLLS

[75] Inventor: Jürgen Schlunke, Krefeld, Fed. Rep. of Germany

[73] Assignee: Kleinewefers GmbH, Krefeld, Fed. Rep. of Germany

[21] Appl. No.: 282,021

[22] Filed: Dec. 8, 1988

[30] Foreign Application Priority Data

Dec. 14, 1987 [DE] Fed. Rep. of Germany ....... 3742293

[51] Int. Cl.⁵ .................. B65H 20/02; B30B 30/00
[52] U.S. Cl. .................. 226/189; 100/155 R; 100/162 R; 100/160
[58] Field of Search ............... 100/121, 160, 172, 176, 100/162 R, 163 A, 155 R; 414/911; 220/189; 211/151, 87; 312/12, 40, 119, 122, 132, 334

[56] References Cited

U.S. PATENT DOCUMENTS

| 337,095 | 3/1886 | Van Wie | 312/40 |
| 654,062 | 7/1900 | Haddox | 312/40 |
| 3,447,453 | 6/1969 | Rojecki | 100/162 R |
| 3,598,041 | 8/1971 | DeNoyer | 100/163 A |
| 3,702,672 | 5/1971 | Becht | 312/40 |
| 4,131,063 | 12/1978 | Joutsjoki | 100/162 R |
| 4,531,729 | 7/1985 | Iemura et al. | 312/132 |
| 4,591,882 | 5/1986 | Takeuchi | 226/188 |

FOREIGN PATENT DOCUMENTS 1558294 12/1979 United Kingdom .
2511401 6/1975 Fed. Rep. of Germany .
3322228 6/1983 Fed. Rep. of Germany .

Primary Examiner—Stuart S. Levy
Assistant Examiner—Paul T. Bowen
Attorney, Agent, or Firm—Peter K. Kontler

[57] ABSTRACT

A magazine for storage of elastic supercalender rolls has two upright frame members each of which carries several tracks at different levels and reciprocable roll holders in the tracks. Chains are provided to move the holders between extended position, in which they are accesible for reception of rolls from a supercalender or from another location, and retracted positions in which the axes of stored rolls are located in a common vertical plane. Each holder on one of the frame members is located at the level of a holder on the other frame member. Movements of holders on one of the frame members are synchronized with movement of corresponding holders on the other frame member.

15 Claims, 4 Drawing Sheets

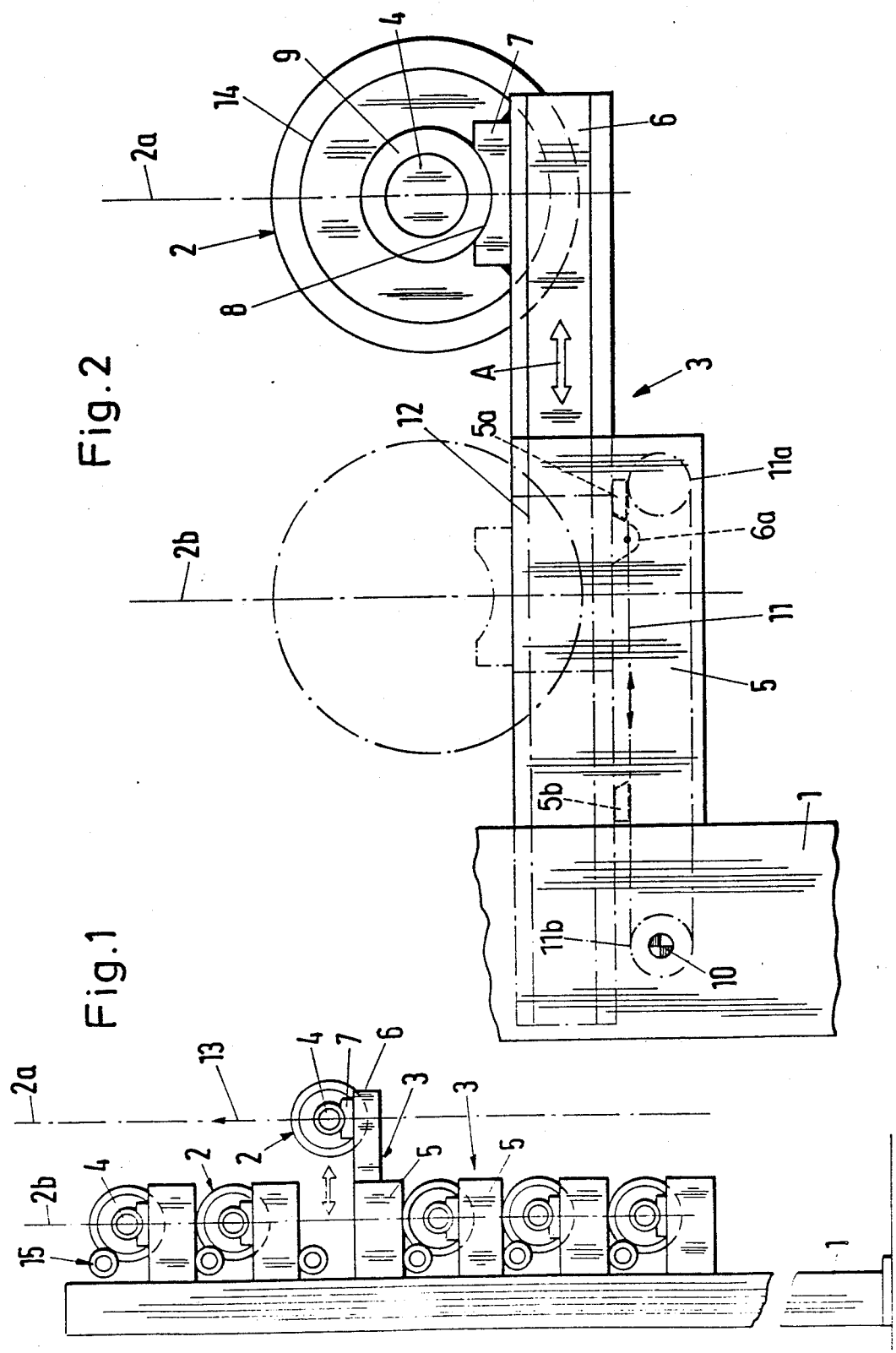

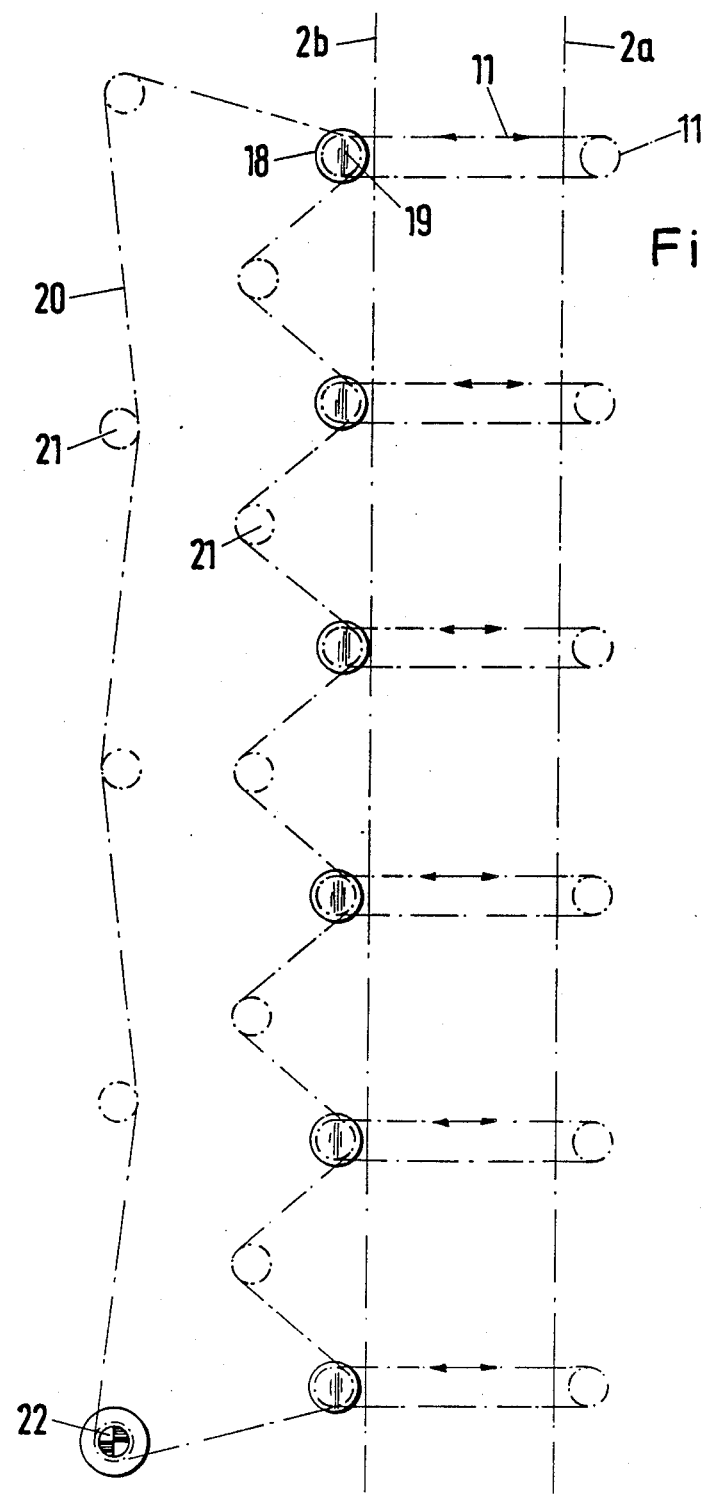

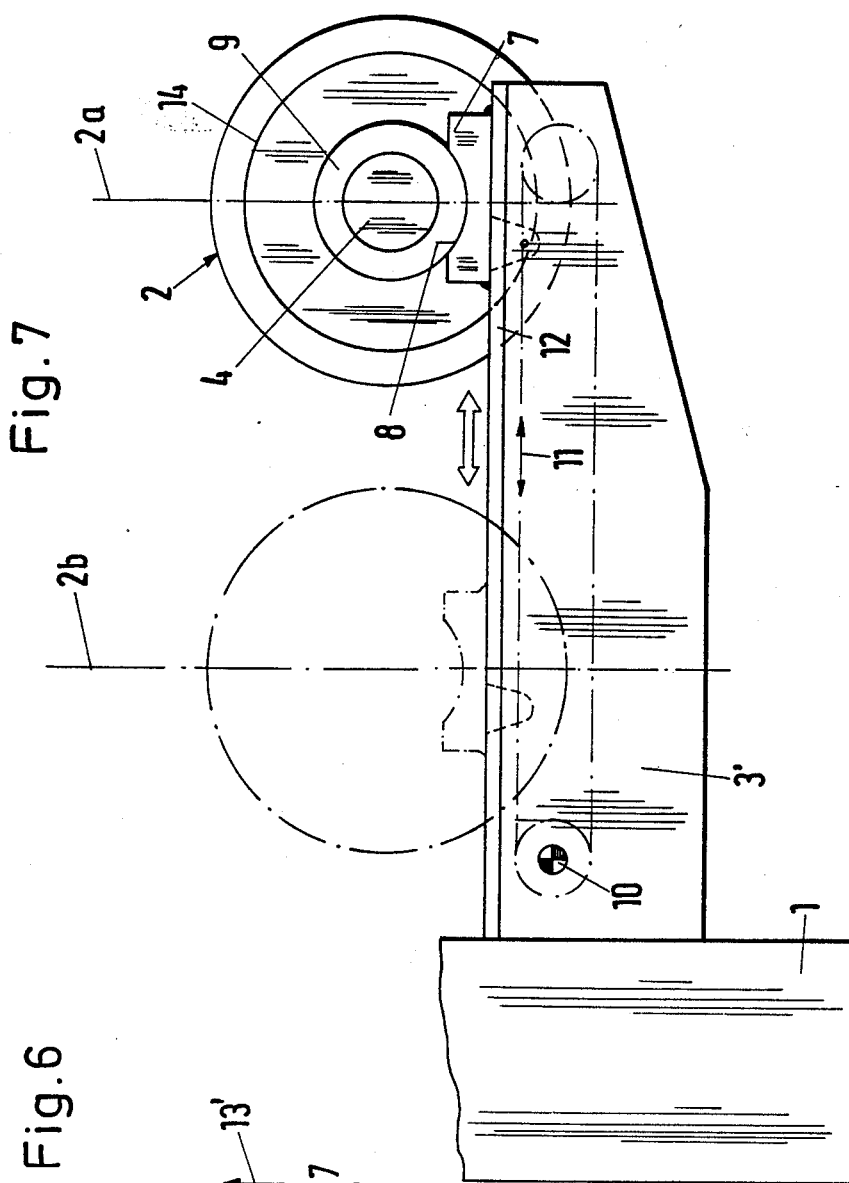
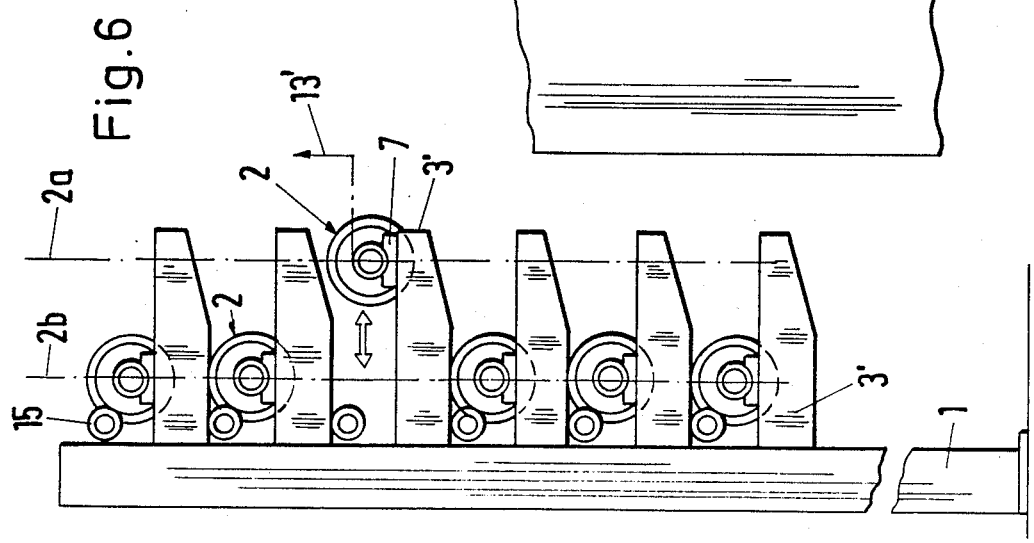

MAGAZINE FOR CALENDER ROLLS

BACKGROUND OF THE INVENTION

The invention relates to magazines for elongated cylindrical or similar objects, and more particularly to improvements in magazines for rolls of the type used in calenders, especially supercalenders.

It is already known to provide two upright frame members in a magazine for several calender rolls with vertically spaced-apart supports for the end portions of calender rolls. Each support on one of the frame members is disposed at the level of a support on the other frame member. When the magazine is occupied, the axes of stored calender rolls are located in a common plane. Magazines of such character are often employed for temporary storage of so-called elastic rolls which are used in supercalenders and have elastically deformable outer layers. Elastic rolls cooperate with hard rolls to define nips for running webs of paper or other material which requires treatment in a supercalender. The magazine can be used for temporary storage of fresh elastic rolls which are to replace damaged elastic rolls or for temporary storage of damped elastic rolls immediately following their removal from a supercalender. The means for transferring rolls to and from the magazine includes a crane with two cables for each end portion of a roll. The cables of each pair carry a sleeve which must be slipped onto the end portion of the roll prior to transfer of the roll from the supercalender into the magazine, from the magazine into the supercalender or from the magazine to a destination other than the supercalender.

The just described mode of transferring rolls to and from a conventional magazine by means of a crane is time-consuming, cumbersome and dangerous. The weight of sleeves for the end portions of an elastic roll of the type used in supercalenders, and especially the combined weight of two such sleeves and an elastic roll, is considerable so that attachment of sleeves to and detachment of sleeves from the end portions of a roll (this work is performed by hand) must be carried out with utmost care. Once a roll is deposited in the magazine, its end portions are provided with sprocket wheels which receive torque from chains so as to rotate the stored rolls in order to prevent the accumulation of moisture (which is contained in their outer layers) into so-called mosisture pockets or bags which would adversely affect the condition of stored rolls. The application of sprocket wheels to the end portions of freshly stored rolls, and detachment of such sprocket wheels from rolls which are about to be transferred from the magazine, also constitutes a time-consuming operation.

It was further proposed to design a magazine for calender rolls in such a way that the rolls can be stored at different levels and that the axes of stored rolls are not disposed in a common vertical plane but are offset in stepwise fashion. Such magazines are equipped with friction wheels which engage properly stored rolls and can be driven to maintain the rolls in rotary motion. Each friction wheel is biased against a metallic part of the adjacent roll by a discrete fluid-operated motor. The means for rotating the friction wheels includes a motor and a belt transmission common to all friction wheels. A drawback of the just described magazines is that they occupy a substantial amount of floor space.

OBJECTS OF THE INVENTION

An object of the invention is to provide a novel and improved magazine which occupies a minimal amount of floor space, which can be installed along a wall or partition in immediate or close proximity to a calender, such as a supercalender, and wherein the stored rolls or facilities for storage of rolls are more readily accessible than in heretofore known magazines.

Another object of the invention is to provide the magazine with novel and improved supporting means for the end portions of calender rolls.

A further object of the invention is to provide the magazine with novel and improved means for moving stored rolls and/or the facilities for storage of rolls relative to the frame.

An additional object of the invention is to provide a novel and improved method of manipulating rolls which are stored in the above outlined magazine and of manipulating facilities for temporary storage of rolls in the magazine.

Still another object of the invention is to provide novel and improved drives for mobile parts of the above outlined magazine.

A further object of the invention is to provide a magazine which is constructed and assembled in such a way that the delivery of rolls thereinto and the removal of rolls therefrom take up less time than in conventional magazines.

Another object of the invention is to provide a magazine which can be used as a superior substitute for heretofore known magazines and wherein the stored rolls need not be provided with sprocket wheels or like rotary parts in order to maintain the stored rolls in rotary motion.

A further object of the invention is to provide a magazine which can accept any desired practical number of standard elastic rolls of the type used in supercalenders.

An additional object of the invention is to provide a magazine which exhibits the advantages but does not embody the drawbacks of heretofore known magazines for calender rolls and like bulky elongated objects.

Another object of the invention is to provide a magazine wherein the stored rolls are readily accessible to standard roll transferring apparatus, such as cranes.

SUMMARY OF THE INVENTION

The invention is embodied in a magazine for storage of calender rolls of the type having first and second end portions (e.g., in the form of smaller-diameter stubs or the like). The improved magazine comprises a pair of spaced-apart upright frame members, and a row of substantially vertically spaced-apart mobile holders on each of the frame members. Each holder on one of the frame members is disposed at the level of a holder on the other frame member, and each holder has means for supporting one end portion of a roll (i.e., the end portions of a properly stored roll are carried by the supporting means of a pair of holders which are disposed at the same level). The magazine further comprises means for moving the holders relative to the frame members.

Each frame member is preferably provided with a plurality of tracks, one for each holder of the respective row, and such tracks extend from one side of the frame. Each track preferably defines a substantially horizontal path for the corresponding holder. The holders are movable relative to their frame members to and from predetermined positions (hereinafter called retracted positions) in which the supporting means are or can be disposed in or close to a common plane, preferably a vertical plane, i.e., in which the axes of stored rolls are disposed in a common vertical plane. The moving means preferably includes means for jointly moving discrete holders on one of the frame members with those holders on the other frame member which are disposed at the same level as the discrete holders, i.e., the moving means serves to jointly move the holders of the aforementioned pairs at the same speed and in the same direction in order to prevent changes of orientation of a roll the end portions of which rest on the supporting means of a pair of holders.

Each supporting means can include a socket (such as a saddle-shaped socket) for one end portion of a roll. Alternatively, each supporting means can simply constitute a seat in the corresponding holder.

The holders can be slidably telescoped into the respective tracks for reciprocatory movement along the corresponding paths.

The magazine can further comprise rotary friction wheels which are provided on at least one of the frame members and are operative to engage rolls the end portions of which are carried by pairs of supporting means in retracted positions of the respective holders. Such friction wheels are rotatable about fixed axes and can include inflatable tires. Common drive means can be provided for all friction wheels or at least for all friction wheels on one of the frame members.

The means for moving the holders can comprise a driving unit in the frame and means for selectively coupling the holders to the driving unit. Still further, the magazine can comprise means for confining the holders to movements between predetermined first and second positions (such as extended positions and the previously mentioned retracted positions) with reference to the corresponding frame members. If the aforementioned coupling means includes electromagnetic clutches, the confining means can include limit switches which are installed in the frame and are operative to disengage the electromagnetic clutches in the corresponding positions of the respective holders.

The novel features which are considered as characteristic of the invention are set forth in particular in the appended claims. The improved magazine itself, however, both as to its construction and the mode of using the same, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a magazine which embodies one form of the invention, one pair of holders and their roll supporting means being shown in extended positions;

FIG. 2 is an enlarged view of a detail in the magazine of FIGS. 1, the retracted positions of a holder and of the corresponding roll supporting means being shown by phantom lines;

FIG. 4 is a schematic elevational view of a modified magazine wherein all holders on a frame member can receive motion from a common drive;

FIG. 6 is a side elevational view of a further magazine wherein the all supporting means form integral parts of the respective holders; and FIG. 7 is an enlarged view of a detail in the magazine of FIG. 6, the retracted position of one of the holders and of its supporting means being indicated by phantom lines.

DESCRIPTION OF PREFERRED EMBODIMENTS

Figure 3:
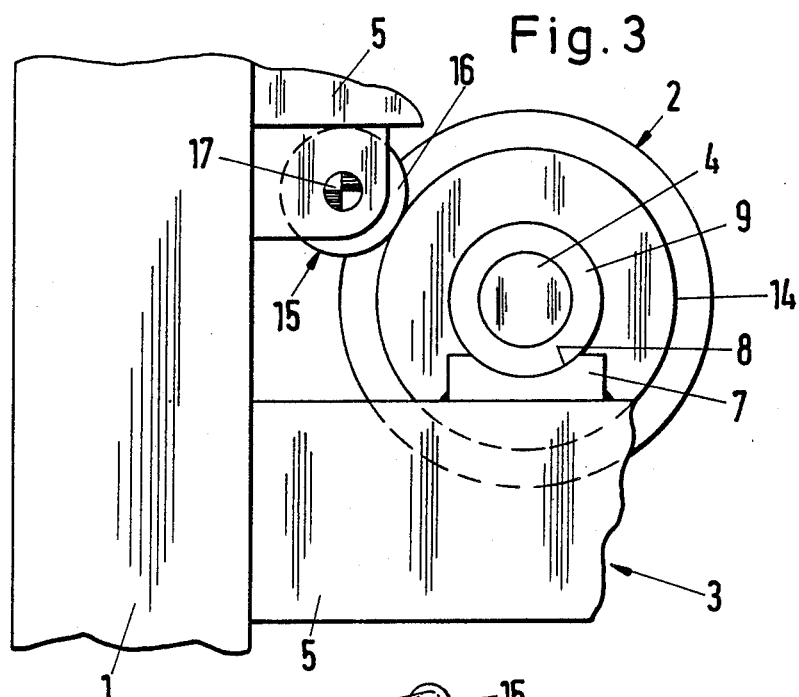
FIG. 3 is an enlarged view of another detail in the magazine of FIG. 1, showing a holder in retracted position and a friction wheel in engagement with a portion of the adjacent roll.

The magazine which is shown in FIGS. 1 and 2 has a frame with two spaced-apart upright frame members 1 each of which carries six preferably identical roll supporting units or assemblies 3 at six different levels one above the other. The frame members 1 can be placed adjacent a wall or partition so that the assemblies 3 confront a supercalender, e.g., a supercalender of the type disclosed in commonly owned copending patent application Ser. No. 272,114 filed November 16, 1988 by Jërgen Schlunke et al. for "Apparatus for exchanging rolls for calenders". The frame members 1 are parallel to each other and the assemblies 3 project beyond that side of the frame which faces away from the aforementioned wall or partition. The number of roll supporting assemblies 3 on each frame member 1 can be reduced to less than or increased to more than six.

The illustrated magazine is filled to capacity, i.e., each pair of aligned assemblies 3 supports a discrete elastic roll 2 of the type customarily employed in supercalenders. Each such roll has two smaller-diameter end portions including stubs 4 and bearing sleeves 9 which surround the respective stubs.

Each assembly 3 includes a horizontal track 5 which can be said to constitute a component part of the respective frame member 1 and defines a horizontal path, a holder 6 which is reciprocably telescoped into the track 5 so that it can be moved back and forth along the respective path, and a supporting means 7 in the form of a saddle-shaped socket or seat which is welded or otherwise rigidly secured to one end portion of the respective holder 6. The upper side of each socket 7 has a concave recess or flute 8 for a portion of the bearing sleeve 9 at the respective end of a roll 2. If the nature of the supercalender is such that the rolls 2 can be withdrawn from their frames without the bearing sleeves 9, the recesses 8 in the upper sides of the sockets 7 are designed to directly receive portions of the stubs 4. The radii of curvature of concave surfaces bounding the recesses 8 match the radii of the bearing sleeves 9. Of course, if the rolls 2 are stored without bearing sleeves 9, the radii of curvature of surfaces bounding the recesses 8 match the radii of the stubs 4.

Each track 5 can have a substantially U-shaped cross-sectional outline and then defines a channel 12 for the respective holder 6. The sockets 7 project upwardly beyond the upper sides of the respective tracks 5 and holders 6, and can be reciprocated with the associated holders between extended positions in which the axes of the rolls 2 carried by the respective assemblies are disposed in a first vertical plane 2a, and retracted positions in which the axes of the rolls 2 which are stored in the magazine are located in a second vertical plane 2b. When in the extended positions, the sockets 7 of two aligned assemblies 3 are ready to be relieved of a roll 2 or they are ready to accept a roll. When in the retracted positions, the sockets 7 maintain the respective rolls 2 close to the nearest sides of the frame members 1 so that the magazine and the rolls which are stored therein occupy a minimum of space.

The means for moving the holders 6 relative to the corresponding tracks 5 comprises discrete reversible electric or other suitable motors 10 and endless chains 11 which are trained over sprockets 11a, 11b in the tracks and are coupled to followers 6a of the corresponding holders 6 so that each such holder, and the associated socket 7, is movable between the retracted and extended positions (note the double-headed arrow A in FIG. 2).

The illustrated moving means can be replaced with other types of moving means without departing from the spirit of the invention. For example, the holders 6 can be reciprocated by fluid-operated (particularly hydraulic) motors employing telescopic or standard cylinder and piston units. It is also possible to employ moving means with so-called cable cylinders. Friction between the tracks 5 and the respective holders 6 can be reduced by using suitable antifriction rolling or other elements in the channels 12.

The arrow 13 denotes in FIG. 1 a crane which can be used to transfer rolls 2 between two aligned assemblies 3 (in extended positions of their holders 6) and the supercalender. It will be noted that both end portions 4, 9 of each roll 2 are readily accessible to the crane 13 when the corresponding holders 6 are moved to the extended positions in which the axis of the roll 2 thereon is located in the vertical plane 2a. The crane 13 can constitute a conventional indoor crane of the type frequently used in manufacturing plants for the transfer of heavy objects. Alternatively, the means for transferring rolls 2 between the improved magazine and a supercalender can comprise fixedly mounted (stationary) electric hoists with two or more cables; this is possible because a roll 2 on two extended holders 6 is readily accessible to hoists for transfer into a supercalender or elsewhere, and the sockets 7 on two extended holders 6 are readily accessible for deposition of two bearing sleeves 9 in their flutes 8.

The operation of each motor 10 in one of the frame members 1 is synchronized with operation of the corresponding motor 10 in the other frame member 1 to ensure that the holders 6 which are located at the same level will invariably move as a unit, either toward their extended positions or toward their retracted positions. The manner of ensuring proper synchronization of pairs of motors is well known from the art and need not be described here.

The means for rotating the rolls 2 in the magazine including the structure of FIG. 1 comprises rotary friction wheels 15, one for each assembly 3 in at least one of the two frame members 1. Each such friction wheel engages a smaller-diameter portion 14 of the adjacent roll 2 when the corresponding holders 6 are maintained in retracted positions. As can be seen in FIG. 3, each friction wheel 15 can include an inflatable and deflatable tire 16 which can be rotated by a discrete motor 17 so as to maintain the roll 2 on the adjacent holders 6 in rotary motion and to thus prevent the gathering of moisture which is, or is likely to be, entrapped in the outermost layer or layers of an elastic roll for use in supercalenders. Each motor 17 is or can constitute a variable-speed electric motor.

The means for confining the holders 6 to movements between their extended and retracted positions includes pairs of microswitches 5a, 5b which are installed in the respective tracks 5 and are connected in circuit with the corresponding motors. The control panel which contains means for starting and arresting the motors 10 and 17 is not shown in the drawing.

The recesses or flutes 8 in the upper sides of the sockets 7 are sufficiently deep to ensure that the rolls 2 are reliably held by the respective pairs of sockets 7 during movement of pairs of aligned holders 6 between retracted and extended positions. This obviates the need for discrete locking or securing devices.

While it is possible to mount the holders 6 on top of the respective tracks 5, the illustrated telescoping of holders into the respective arms is preferred because this contributes to compactness of the assemblies 3 and ensures highly reliable guidance of holders during movement between retracted and extended positions.

It is further possible to mount each socket 7 on a second holder (not shown) which is slidably telescoped into or is otherwise movable in or on the corresponding holder 6. This renders it possible to move the sockets 7 even further away from the frame members 1 in the extended positions of holders 6 and the respective second holders. The just described modified assemblies will be used when the mutual spacing of the improved magazine and the supercalender suffices to ensure that the sockets 7 can be moved to the right and beyond the plane 2a of FIG. 1. Similar results can be achieved by equipping the illustrated assemblies 3 with longer holders 6 which, when moved to extended positions, can support the respective sockets 7 to the right of the vertical plane 2a (as seen in FIGS. 1 and 2). It has been found that the illustrated assemblies 3 (each with a single reciprocable holder 6) normally suffice to ensure that a roll 2 can be readily deposited onto or lifted off two aligned sockets 7 in the extended positions of the respective holders 6. Moreover, such assemblies are simpler, more compact, stabler and less expensive than assemblies each of which employs a plurality of reciprocable holders.

The sockets 7 perform the dual function of supporting the end portions of the rolls 2 thereon as well as of urging the roll portions 14 against the adjacent friction wheels 15 to thus ensure that a roll in the magazine can be set in rotary motion as soon as the respective holders 6 assume their retracted positions. This obviates the need for discrete means which would bias stored rolls against the adjacent friction wheels and/or vice versa. Friction wheels which consist of or employ inflatable tires or like parts are preferred at this time because they can yield to the impact of roll portions 14 (in response to movement of the respective holders 6 to their retracted positions) and also because they can compensate for manufacturing tolerances.

FIG. 4 shows schematically a portion of a modified magazine wherein the means for moving the holders 6 (not shown) between their extended and retracted positions comprises a single prime mover (driving unit) 22. This prime mover continuously drives an endless chain 20 which is trained over sprocket wheels 19 and tensioning rolls 21. The sprocket wheels 21 are coaxial with the respective sprocket wheels 11b (not shown in FIG. 4) and can transmit torque to the coaxial sprocket wheels 11b (to drive the respective chains 11 and holders 6) in response to engagement of corresponding electromagnetic clutches 18. When a clutch 18 is engaged, the respective sprocket wheel 19 drives the adjacent endless chain 11 to thereby move the associated holder 6 along the respective horizontal path in a manner as described in connection with FIG. 22. The clutches 18 can establish form-locking or force-locking connections between the sprocket wheels 19 and the adjacent chains 11. Each such clutch can be engaged or disengaged independently of the other clutches. An engaged clutch 18 can be disengaged in response to signals from the corresponding limit switches 5a, 5b (not shown in FIG. 4).

An advantage of the magazine which embodies the structure of FIG. 4 is that a single prime mover 22 suffices to drive one, two or all chains 11. This contributes to lower initial and maintenance cost of the magazine. The shafts for the pulleys 11a and 11b on one of the frame members 1 can carry the corresponding pulleys 11a, 11b on the other frame member 1. This ensures automatic synchronization of movements of holders 6 which are disposed at the same level.

Figure 5:
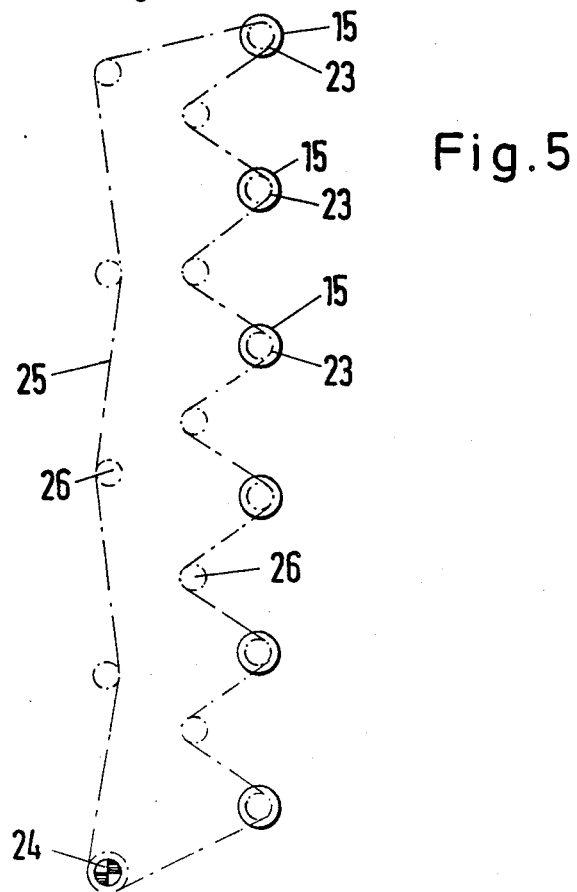
FIG. 5 is a similar schematic elevational view of a third magazine wherein all friction wheels on a frame member can receive torque from a common drive.

FIG. 5 shows that the magazine of FIGS. 1 to 3 can be further modified by replacing discrete motors 17 for the friction wheels 15 with a single prime mover (driving unit) 24 which continuously drives an endless chain 25. The latter is trained over sprocket wheels 23 and tensioning rolls 26. Each sprocket wheel 23 drives one of the friction wheels 15.

FIGS. 6 and 7 shows a further magazine wherein the holders 6 of FIGS. 1-3 are replaced with holders in the form of sockets or seats 7 which are reciprocable by chains 11 substantially in the same way as described for the holder 6 of FIG. 2. In this embodiment of the magazine, the roll supporting means are the surfaces bounding the recesses or flutes 8 in the sockets 7. Each socket 7 resembles a saddle and is movable between an extended and a retracted position, (note the vertical planes 2a, 2b which respectively receive the axes of rolls 2 in the extended and retracted positions of the respective sockets 7). The reference characters 3' denote tracks which can be said to constitute parts of the respective frame members 1 and define paths for movement of the sockets (holders) 7 between their extended and retracted positions. The length of a track 3' can match or approximate the combined length of a track 5 and holder 6 in extended position of the holder 6. Discrete motors 10 for the chains 11 in the magazine of FIGS. 6 and 7 can be replaced with a common prime mover (note the prime mover 22 of FIG. 4). A crane 13' which is used in conjunction with the magazine of FIGS. 6 and 7 must perform a composite movement in order to insert the end portions of a roll 2 into a selected pair of flutes 8 or to remove the end portions of a roll 2 from such flutes.

Without further analysis, the foregoing will so fully reveal the gist of the present invention that others can, by applying current knowledge, readily adapt it for various applications without emitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A magazine for storage of calender rolls of the type having first and second end portions, comprising a pair of spaced-apart frame members; a row of substantially vertically spaced-apart mobile holders on each of said frame members, each holder on one of said frame members being disposed at the level of a holder on the other of said frame members and each holder having means for supporting one end portion of a roll, said holders being movable to and from predetermined retracted positions; means for moving said holders relative to the respective frame members; and friction wheels provided on at least one of said frame members and operative to engage rolls the end portions of which are carried by pairs of said supporting means in retracted positions of the respective holders.

2. The magazine of claim 1, wherein said frame has a first side and a second side and each of said frame members includes a plurality of tracks, one for each of the corresponding holders, each of said tracks defining a substantially horizontal path for the corresponding holder and said tracks extending from one side of said frame.

3. The magazine of claim 1, wherein the holders in said retracted positions maintain the respective supporting means in a common plane.

4. The magazine of claim 3, wherein said plane is substantially vertical and said moving means includes means for jointly moving discrete holders on one of said frame members with those holders on the other of said frame members which are disposed at the levels of said discrete holders.

5. The magazine of claim 1, wherein each of said supporting means includes a socket for one end portion of a roll.

6. The magazine of claim 5, wherein each of said sockets is a saddle.

7. The magazine of claim 1, wherein each of said frame members includes a track for each of the corresponding holders and each of said tracks defines a substantially horizontal path for the corresponding holder, said holders being slidably telescoped into the corresponding tracks for reciprocatory movement along the respective paths.

8. The magazine of claim 1, wherein each of said frame members includes a track for each of the corresponding holders, said tracks defining substantially horizontal paths for the corresponding holders and each of said supporting means including a seat in the corresponding holder.

9. The magazine of claim 1, wherein said friction wheels are rotatable about fixed axes.

10. The magazine of claim 9, further comprising means for rotating said friction wheels.

11. The magazine of claim 1, wherein each of said friction wheels comprises an inflatable tire.

12. The magazine of claim 1, further comprising common drive means for rotating said friction wheels.

13. The magazine of claim 1, wherein said moving means comprises a driving unit in said frame, and means for selectively coupling said holders to said driving unit.

14. The magazine of claim 1, further comprising means for confining said holders to movements between said retracted positions and predetermined second positions with reference to the corresponding frame members.

15. A magazine for storage of calender rolls of the type having first and second end portions, comprising a pair of spaced-apart frame members; a row of substantially vertically spaced-apart mobile holders on each of said frame members, each holder on one of said frame members being disposed at the level of a holder on the other of said frame members and each holder having means for supporting one end portion of a roll; means for confining said holders to movement between predetermined first and second positions with reference to the corresponding frame members; and means for moving said holders relative to the respective frame members, said moving means comprising a driving unit in said frame and electromagnetic clutches provided in said frame and engageable to transmit motion from said driving unit to the respective holders, said confining means including limit switches provided in at least one of said frame members and operative to disengage the respective clutches in corresponding positions of the respective holders.

* * * * *